United States Patent [19]

Gohda et al.

[11] 4,308,563
[45] Dec. 29, 1981

[54] CONTROL APPARATUS FOR MAGNETIC RECORDER

[75] Inventors: Seiichi Gohda; Akira Tajiri, both of Kanagawa, Japan

[73] Assignee: Sony Corporation, Tokyo, Japan

[21] Appl. No.: 80,524

[22] Filed: Oct. 1, 1979

Related U.S. Application Data

[63] Continuation of Ser. No. 891,278, Mar. 29, 1978, abandoned.

[30] Foreign Application Priority Data

Apr. 5, 1977 [JP] Japan .................................. 52-38081

[51] Int. Cl.³ .......................................... G11B 15/06
[52] U.S. Cl. ..................................... 360/72.1; 360/33
[58] Field of Search .................... 360/72.1, 72.2, 14, 360/10, 11, 33, 72.3

[56] References Cited

U.S. PATENT DOCUMENTS

| | | | |
|---|---|---|---|
| 3,736,565 | 5/1973 | Sidline | 360/72.1 |
| 3,821,710 | 6/1974 | Arciprete et al. | 360/72.1 X |
| 3,921,220 | 11/1975 | Primosch et al. | 360/72.3 |
| 3,925,815 | 12/1975 | Lemelson | 360/72.1 X |
| 3,939,491 | 2/1976 | Shigeta | 360/72.1 X |
| 3,956,740 | 5/1976 | Jones et al. | 360/72.1 X |
| 3,987,484 | 10/1976 | Bosche et al. | 360/72.1 |
| 4,066,872 | 1/1978 | Karp et al. | 360/72.1 X |
| 4,089,027 | 5/1978 | Grigoletti | 360/72.1 |
| 4,224,644 | 9/1980 | Lewis et al. | 360/72.2 |

OTHER PUBLICATIONS

National Technical Report, vol. 19, No. 3, Jun. '73, VTR-Automatic Program Selector for VTR-Yasu et al.

Primary Examiner—John H. Wolff
Attorney, Agent, or Firm—Lewis H. Eslinger; Alvin Sinderbrand

[57] ABSTRACT

Position control apparatus is provided for a magnetic information device that uses a magnetic recording medium having a readable series of pulses recorded along a serial path thereon. For example, the magnetic information device could be a video tape recorder and the magnetic recording medium could be a video tape with a series of control pulses recorded upon it. The position control apparatus includes a reading device for serially reading the recorded pulses and for producing a corresponding train of output pulses, a counter for counting the output pulses and for providing a count value corresponding to a position on the recording medium, a memory for settably storing a value corresponding to a desired position on the recording medium, a comparator for comparing the count value from the counter and the stored value from the memory, and a search device which, upon selective operation thereof, is operative to cause the reading device to serially read the recorded pulses until a predetermined relation is obtained between said two values to be compared by the comparator.

5 Claims, 5 Drawing Figures

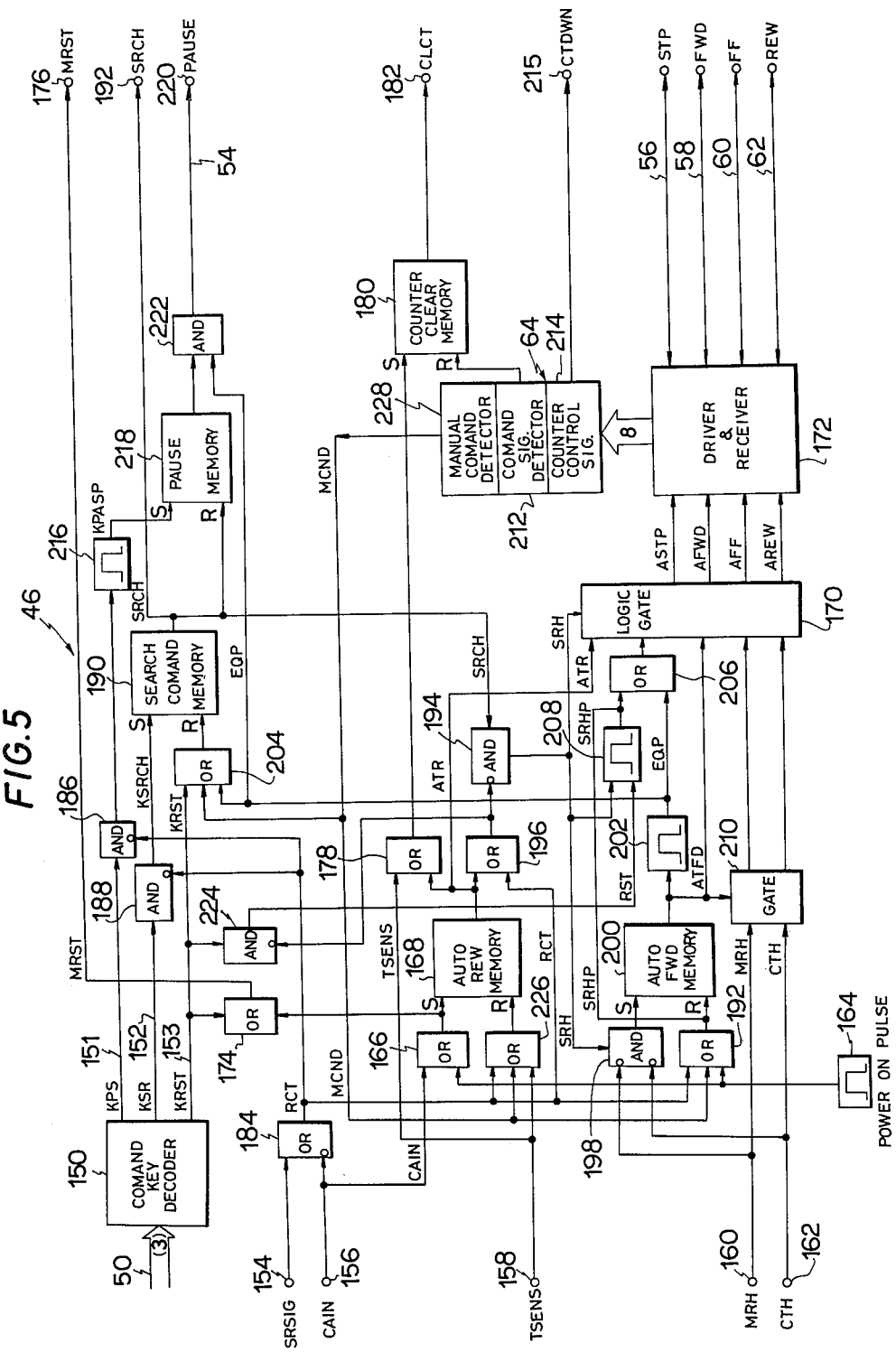

CONTROL APPARATUS FOR MAGNETIC RECORDER

This is a continuation of application Ser. No. 891,278, filed Mar. 29, 1978 now abandoned.

BACKGROUND OF THE INVENTION

1. Field of the Invention

This invention relates to an apparatus for controlling the operation of a magnetic information device, for example, a video tape recorder (VTR), and more specifically, to an apparatus for located a desired position upon a magnetic recording medium used with such magnetic information device.

2. Description of the Prior Art

Conventionally, there are several types of tape position selecting apparatus. According to one such prior art system, an address code signal is recorded on an address code track in digital form. Since this system provides very precise tape position selection, it is often used in document retrieval systems that uses a VTR and in a video tape editing systems. Unfortunately this prior art system requires a special code signal and address track, and complex circuitry. In addition, it can be applied only to a video tape that has been recorded by a particular type of VTR.

A video tape position selector often does not need to be as precise as the above described prior art system. For instance, if one program is to be selected from among 5 programs recorded on a cassette tape, relatively rough selection of tape position will do. One possible technique to achieve this purpose is to insert and record a tone burst at the starting position of each program on, for example, an audio channel; but this first requires a special recording device for the tone burst, and secondly, it can select only the tape position on which the tone burst is recorded. In other words, it is not capable of finding tape positions which have not been previously marked.

SUMMARY OF THE INVENTION

Accordingly, it is an object of this invention to provide a new position control apparatus.

More particularly, it is an object of this invention to provide a position control apparatus that is relatively simple in construction.

Another object is to provide a position control apparatus that can find positions on a magnetic recording medium even if such positions have not previously been marked by such position control apparatus.

Yet another object is to provide a position control apparatus which can be employed with video tape recorders presently on the market to find positions on video tapes recorded in presently used video tape recording formats.

Still another object is to provide a position control apparatus that determines a desired tape position by comparing a number selected by an operator with the number of recorded control pulses on the video tape which are counted as the tape moves past a control pulse reading head.

In accordance with an aspect of this invention, position control apparatus for a magnetic information device that uses a magnetic recording medium having a readable series of pulses recorded along a serial path thereon is provided with reading means for serially reading the recorded pulses and for producing a corresponding train of output pulses, counter means for counting the output pulses and for providing a count value corresponding to a position on the recording medium, memory means for settably storing a value corresponding to a desired position on said recording medium, comparator means for comparing the count value from the counter means and the stored value from the memory means, and search means which, upon selective operation thereof, is operative to cause said reading means to serially read the recorded pulses until a predetermined relation is obtained between the two values to be compared by said comparator means.

It is a further feature of the invention that the recording medium can be a magnetic tape, as in a video cassette used in a video tape recorder, and that the series of recorded pulses can comprise control pulses recorded on the video tape. In addition, the comparator means desirably includes means for generating a first signal that indicates that the count value from the counter means is larger than the stored value from the memory means and for generating a second signal that indicates that the count value is smaller than the stored value, and the search means desirably includes means for setting the video tape recorder to a rewind mode and a fast-forward mode in response to the presence of said first and second signals, respectively.

The above, and other objects, features, and advantages of the invention, will be apparent in the following detailed description of an illustrative embodiment of the invention which is to be read in connection with the accompanying drawings.

BRIEF DESCRIPTION OF THE DRAWINGS

FIGS. 4 and 5 are block diagrams which describe the circuitry of FIG. 2 in greater detail.

DETAILED DESCRIPTION OF THE INVENTION

Figure 1:
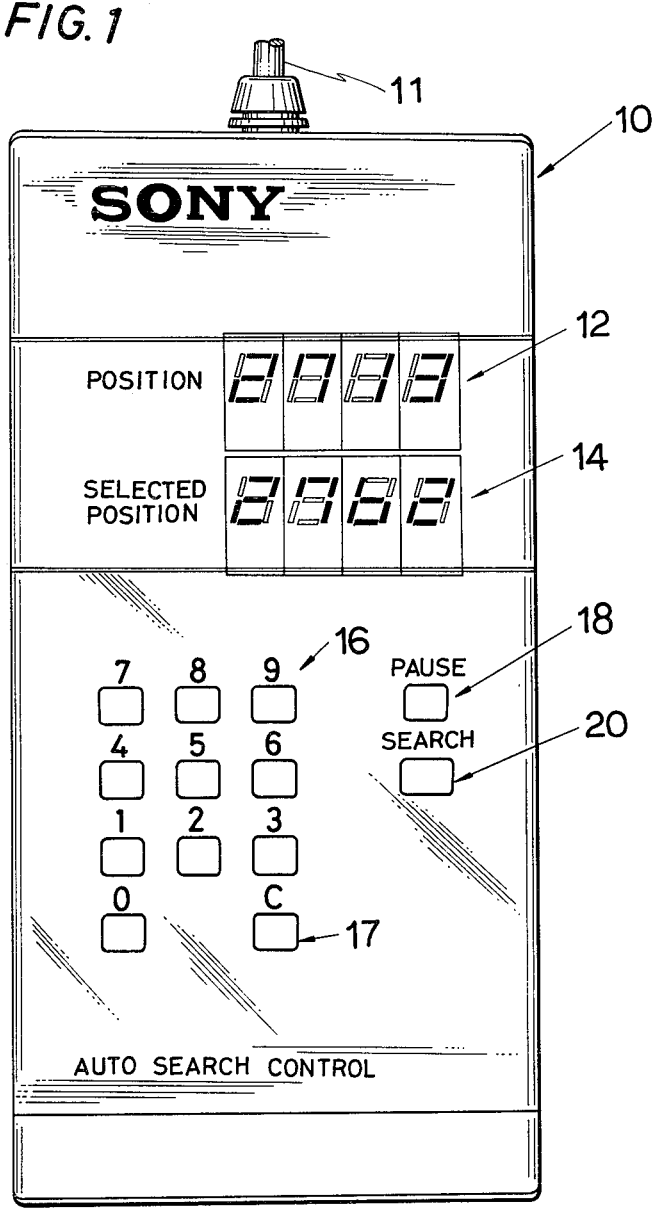
FIG. 1 illustrates of a VTR remote control unit which constitutes an embodiment of this invention.

FIG. 1 shows the appearance of a VTR remote control unit 10 which incorporates an embodiment of the present invention. This remote control unit 10 is connected to VTR (not shown) by a cable 11. The remote control unit 10 has two displays 12 and 14. The first display 12, labeled "POSITION", is a 4-digit control pulse (CTL) counter display showing the current position of the tape. The second display 14, labeled "SELECTED POSITION", is a selected tape address display showing or a tape position that can be freely selected by the operator's key operation. The reference numeral 16 represents a ten-key pad having a separate key for each of the numerals 0 through 9. The reference numeral 17 represents a clear key C. The ten-key pad 16 is used for inputting a desired tape position to be displayed on the second display 14. The clear key 17 is used, as will be described hereinafter, for resetting an address memory associated with the display 14 to zero, as well as for providing a VTR stop command. The reference numeral 18 represents a pause key which is used, as will be described hereinafter, for providing a pause-on command during a play mode. The "pause" here used means a mode for stopping the tape run in a playback mode. The reference numeral 20 represents, a search key which is used, as will be described hereinafter, for commanding a search mode.

Figure 2:
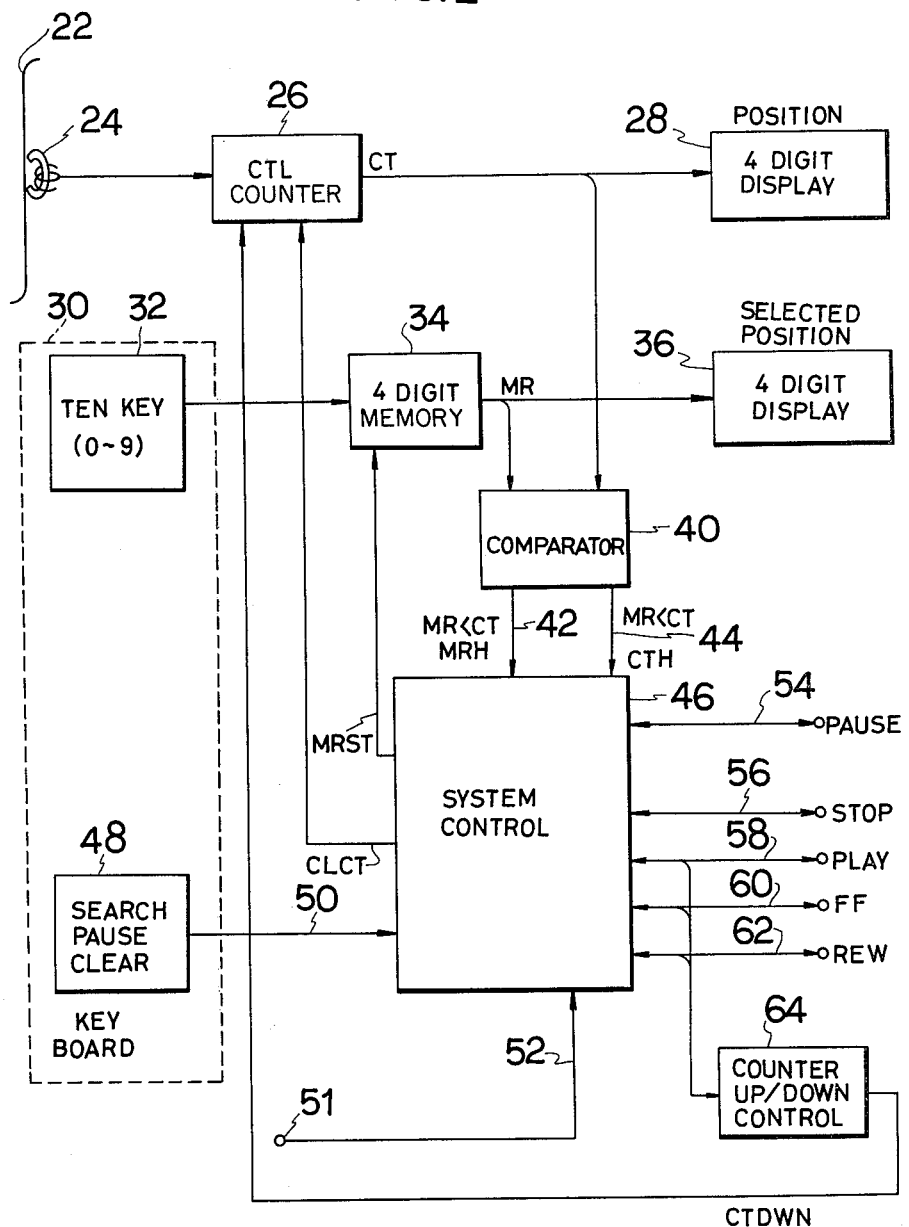
FIG. 2 is a block diagram that shows the functions of the control unit shown in FIG. 1.

FIG. 2 is a block diagram illustrating the functions of the remote control unit 10 shown in FIG. 1. FIG. 2 also shows a CTL head 24 that is associated with a magnetic recording medium, VTR tape 22. Tape 22 has a series of CTL pulses recorded along a serial path thereon. The CTL head 24 provides means for serially reading these recorded CTL pulses and for producing a corresponding train of CTL output pulses. A CTL counter 26 counts the CTL output pulses which the CTL head 24 has detected from the tape 22 and provides a count value CT corresponding to the current position of that tape. The count value CT from the counter 26 is supplied to a 4-digit display 28 which shows the number of CTL pulses as which have been counted from the tape top, or tape start, the current tape position.

A ten-key section 32 of a keyboard 30 is connected to a 4-digit memory 34 which provides means for settably storing a value corresponding to a desired position on the tape 22. This memory 37 stores a tape position address selected by the key operation of ten-key section 32. The value stored in the memory 34 is provided to a 4-digit display 36 as an MR signal. The display 36 indicates a selected tape position.

A CT signal from the CTL counter 26 and an MR signal from the memory 34 are provided to a comparator 40, which provides means for comparing the count value CT and the stored value MR. The comparator 40 generates a first signal (CTH) upon an output line 44 that indicates when the count value CT is larger than the stored value MR, and it generates a second signal (MRH) upon an output line 42 that indicates when CT is smaller than MR. These output lines 42 and 44 of the comparator 40 are connected to a system control 46. The system control 46 provides search means, which, upon selective operation thereof, are operative to cause the VTR to serially move tape 22 past CTL head 24 until CT equals MR. The system control 46 causes tape 22 to move relative to CTL head 24 at a high speed until CT equals MR, and it also includes automatic start means for causing the tape to move at a slower speed, suitable for playing the video tape, once a CT value has been counted which equals MR.

The system control 46 receives a search, pause or clear command signal from a function key section 48 of the keyboard 30 through a line 50, and receives a signal that represents the cassette-in state and the VTR power-on state from a terminal 51 through a line 52. The system control 46 is further connected to the VTR through lines 54, 56, 58, 60 and 62. The line 54 transmits a pause signal, the line 56 a stop signal, the line 58 a play signal, the line 60 a fast forward (FF) signal, and the line 62 a rewind (REW) signal.

A counter up/down control 64 receives signals from the lines 58, 60 and 62, and provides a signal (CTDWN signal) for controlling the direction in which the CTL counter 26 counts CTL pulses.

The system control 46 provides clear signals (CTCL signal and MRST signal) to the CTL counter 26 and the memory 34, respectively.

For the purpose of the present explanation, the remote control unit 10 operates by power supplied from the VTR it is to control, but alternatively, it may have a self-contained power supply.

Figure 3:
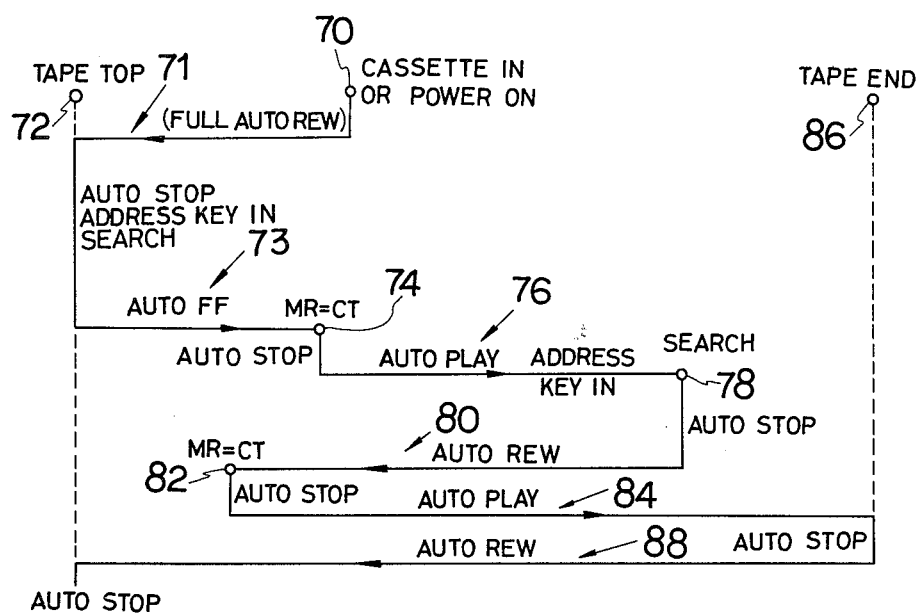
FIG. 3 demonstrates the effect of the control unit, shown in FIGS. 1 and 2 upon the operation of a VTR.

FIG. 3 illustrates the operation of the remote control unit 10. In this Figure, tape positions are indicated on horizontal lines. Either connecting the remote control unit 10 to the VTR, turning the VTR power on, or properly installing a cassette cause a full auto-rewinding mode to start. In other words, if the cassette tape position is at 70, the tape is rewound to the tape top, or start, position 72 in the full auto-rewinding mode that is indicated by 71. Referring to FIG. 2, the mode 71 is set by a signal indicating the loading of a cassette or the turning on a VTR power. When this signal is applied to the system control 46 through the line 52 from the terminal 51, the system control 46 provides a REW signal to the VTR through the line 62. The VTR automatically stops at the tape top position 72.

At this tape top position, the ten-key section 32 can be operated to address a tape position which can then be stored in the memory 34 and displayed on the display 36 at the same time.

Depressing the search key 20 included in the function keys 48 produces a signal on the line 50 that conditions the system control 46 to energize the FF line 60 for driving the VTR in FF mode. As the tape is being driven, the CTL counter 26 counts the CTL pulses being reproduced and displays momentarily the count value (CT signal) on the display 28. The comparator 40 compares the CT address signal with a selected tape address signal (MR signal) from the memory 34 and causes the fast forward (FF) mode to stop at the tape position 74 where MR=CT. This auto fast forward mode is indicated as 73 in FIG. 3. At the tape position where MR=CT, no signal is generated on either line 42 or 44. As a result, the stop line 56 is energized, and then the system control 46 energizes the line 58 for setting the VTR to an auto play mode, which is indicated as 76 in FIG. 3.

The operator can select a new tape position to be addressed, for example, tape position 82 shown in FIG. 3, by operating the ten-key section 32 during the mode 76, whereupon the newly selected tape position will be stored in memory 34 and shown on display 36. If the search key 20 is depressed again at the tape position 78, the VTR is automatically stopped for a while before the comparison between the CT signal at the position 78 and the newly provided MR signal sets the VTR to either the auto fast forward mode or the rewind mode. FIG. 3 illustrates the case of auto rewind mode 80. After the VTR automatically stops at the position 82 where MR=CT, it is again set to auto play mode 84. If no new tape position has been selected, however, depression of the search key 20 while the tape is at position 78 causes the tape to be rewound to the last addressed tape position 74.

The VTR used in the above described embodiment of this invention is capable of automatically detecting the tape end 86, stopping temporarily at that position, and being set to the auto rewind mode indicated by 88 until it stops automatically at the tape top position 72.

As will be understood from the above explanation, depression of the search key 20 sets the tape to either FF or REW mode until it reaches an addressed tape position. The comparator 40 determines whether the VTR should operate in the FF mode or the REW mode by generating either and MRH or a CTH signal, respectively. The counter up/down control 64 detects energized state of the PLAY, FF and REW lines 58, 60 and 62 for controlling the direction in which the counter 26 counts the CTL pulses. If the PLAY line 58 or FF line 60 is energized, the counter 26 is set to a state where it is to count in forward direction, whereas if the REW line 62 is energized, the counter 26 is set to a state where it is to count in reverse direction.

In the explanation above, the VTR is temporarily set to the auto stop mode at every mode transition from 71 to 73, from 73 to 76, from 76 to 80, from 80 to 84, and from 84 to 88. This is in order to prevent possible errors from occurring when the VTR is switched from the FF or PLAY mode to the REW mode or vice versa. At such switching times the up/down control signal CTDWN to the CTL counter 26 must be switched, but, in order to prevent miscounting, it should not be switched while the tape is running in either direction.

Figure 4:
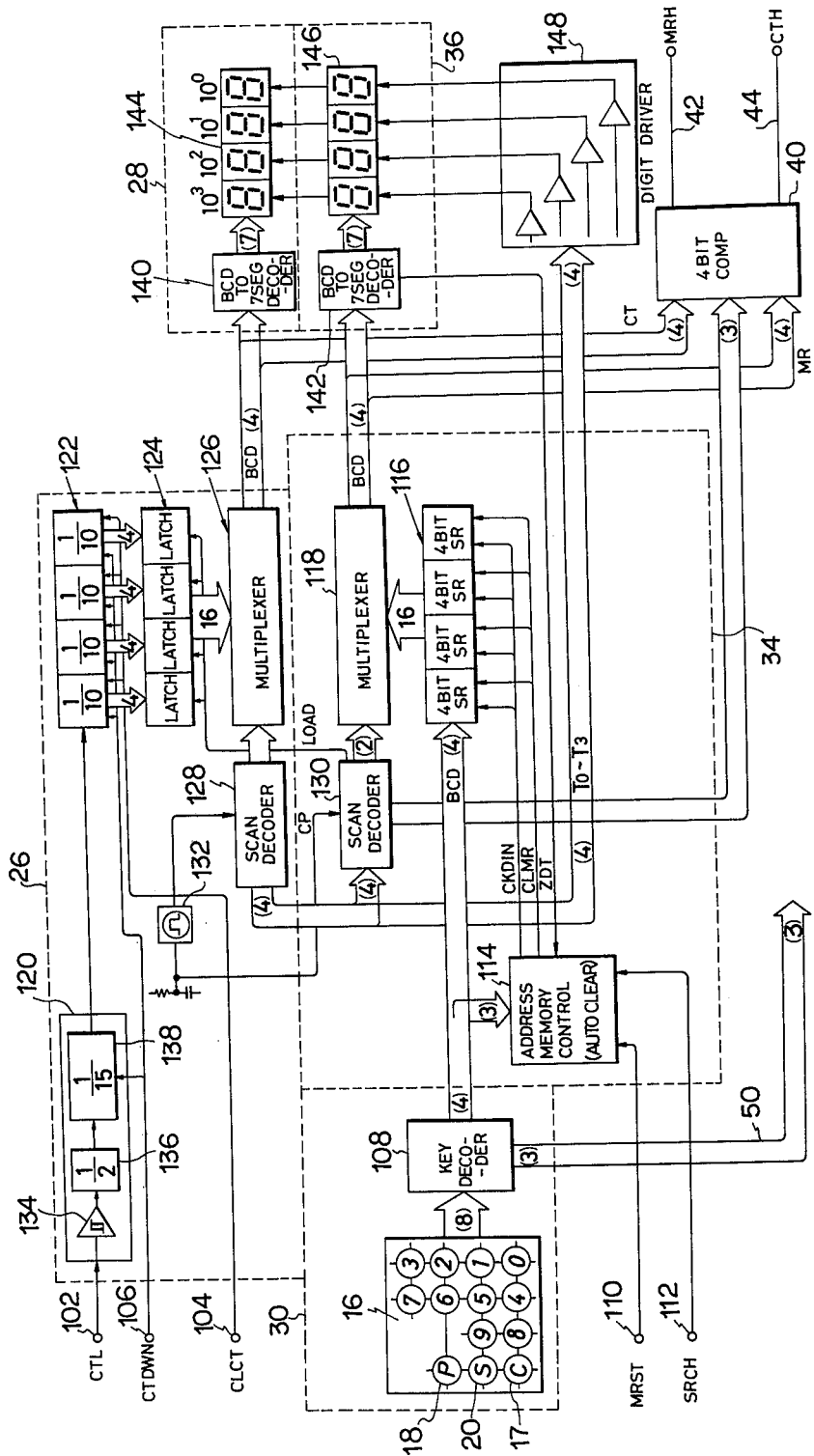

FIGS. 4 and 5 are more detailed block diagrams of the embodiment of this invention illustrated in FIG. 2.

FIG. 4 shows the CTL counter 26, its display section 28, the address memory 34, its display section 36, the keyboard 30 and the comparator 40. FIG. 5 shows the details of the system control 46 and the counter up/down control 64. The circuit elements used in FIGS. 4 and 5 are low power CMOS IC's. As a result, the total current flowing through the entire circuit during operation is only 0.2 A at maximum; this helps reduce the power capacity required of the VTR power supply and helps make the remote control cables smaller.

By reference to FIG. 4, the CTL pulse reproduced by the VTR is provided to the CTL counter 26 through a terminal 102. To this CTL counter 26 is supplied a counter clear (reset) signal (CLCT) from the system control 46 through a terminal 104 as well as a counting direction control signal (CTDWN) from the counter up/down control 64 through a terminal 106.

The keyboard 30 has a key decoder 106 that receives an 8-bit signal from the ten-key numeric pad 16, the pause key 18, the search key 20 and the clear key 17. The key decoder 108 provides to the address memory 34 the data associated with the ten-key pad, and to the system control 46 the data associated with the three function (command) keys 17, 18 and 20 through the line 50.

The address memory 34 receives a memory reset signal (MRST) from the system control 46 through a terminal 110 and also a search signal (SRCH) through a terminal 112. The memory 34 has an address memory control 114 to receive these two signals. The control 114 receives from the decoder 108 the information associated with the ten-key pad 16 and receives a signal (ZDT) from the display 36. The ZDT signal functions so that a more-than-4-digit signal may not be input to the memory. The control 114 outputs signals, CKDIN and CLMR, that control the operation of a 4-stage, 4-bit shift register memory 116. The CLMR signal clears the memory 116. The memory 116 receives the ten-key information in the form of BCD format from the key decoder 108. The output data from the memory 116 is supplied to the display 36 by means of a multiplexer 118.

The CTL counter 26 includes a divider 120, a 4-stage decimal counter 122, latches 124 and a multiplexer 126. The multiplexer 126 and the multiplexer 118 of the address memory 34 are controlled by their respective scan decoders 128 and 130. The two scan decoders receive the output of an oscillator 132. The scan decoder 130 provides a load signal to the latches 124.

The divider 120 which receives the CTL pulses comprises a Schmitt trigger 134, a binary counter 136 and a quindecimal counter 138. The counting direction control signal from the terminal 106 is provided to the quindecimal counter 138 of the divider 120 as well as to the 4-stage decimal counter 122. The counter clear signal from the terminal 104 is provided to the decimal counter 122.

The output signals in BCD format from the multiplexers 126 and 118 are provided to the BCP to-7-segment decoders 140 and 142, respectively of the displays 28 and 36, respectively. The segment outputs from these decoders are provided to displays 144 and 146, each consisting of 4 display elements. Digit inputs to these displays are provided to a digit driver 148. The scan decoder 128 supplies the input signal to the digit driver.

The BCD output signals CT and MR from the multiplexers 126 and 118 are provided to the 4-bit comparator 40 which is operated by a signal from the scan decoder 130. The output line 42 of the comparator 40 provides the aforementioned MRH signal to the system control 46, and the output line 44 provides the aforementioned CTH signal to the system control 46.

The system control 46 illustrated in FIG. 5 has a function key decoder 150 that is connected to the line 50 extending from the key decoder 108 of the keyboard 30. The key decoder 150 has 3 output lines 151, 152 and 153. Upon depression of the pause button 18, a KPS signal is output to the line 151; depressing the search button 20 causes a KSR signal to be output to the line 152; and depression of the clear button 17 causes a KRST signal to be output to the line 153.

Terminals 154, 156 and 158 are connected to the VTR. To the terminal 154 is provided a SRSIG signal in certain operational mode of the VTR, such as the recording modes the dubbing mode, or the timer operating mode. To the terminal 156 is provided a signal (CAIN) generated in response to cassette loading. To the terminal 158 is provided a signal (TSENS) from the tape top sensor of the VTR. Terminals 160 and 162 are connected to the output lines 42 and 44 of the comparator 40, respectively. The terminal 160 receives the MRH signal, and the terminal 162 the CTH signal. A signal source 164 outputs a pulse signal when the power of the VTR is turned on or when the VTR supplies power to the remote control unit 10.

No description is given hereinafter on the logic level of signals to be provided by logic devices used in the system control 46, but it will be obvious to those skilled in the art that they can properly select positive or negative logic levels depending on the need.

Loading a cassette into the VTR or turning the power on cause an OR gate 166 to supply a signal that triggers an auto REW memory 168 to a set condition. The output signal from the memory 168 is supplied to a logic gate device 170 as an ATR signal, whereupon an AREW line is energized and the REW line 62 to the VTR is energized by way of an interface device 172, and the VTR assumes the auto rewinding mode 71 (see FIG. 3). At the same time, the output signal of the OR gate 166 passes through a gate 174 to provide an MRST signal to a terminal 176. The MRST signal is provided to the terminal 110 of the address memory 34 (FIG. 4) to resets that address memory.

When the tape being rewound has reached the tape top, the VTR tape top sensor provides a TSENS signal to the terminal 158, which signal resets the auto REW memory 168, causing that memory to stop generating ATR signals. Hence, the output line 62 to the VTR ceases to be energized, while the STP line 56 becomes energized, so that the VTR stops automatically.

The output of the auto REW memory 168 passes through an OR gate 178 and sets a counter clear memory 180 to provide a CLCT signal to a terminal 182.

The CLCT signal is provided to the terminal 104 (FIG. 4) for resetting the CTL counter 26. Thus, it can be seen that this invention includes auto rewind means for bringing a video cassette to a tape start position and resetting counter 26 to zero in response to the installation of that video cassette into the VTR. The TSENS signal at the terminal 158 can likewise provide the CLCT signal.

An OR gate 184 provides an RCT signal if the SRSIG signal is present at the terminal 154 or if the CAIN signal is absent at the terminal 156 or if both the SRSIG signal is present and the CAIN signal is absent. The RCT signal is supplied to AND gates 186 and 188. The AND gates 186 and 188 can gate the KPS signal on line 151 and the KSR signal on line 152, respectively, if the RCT signal does not exist.

The KSR signal provided to the line 152 by depressing the search button 20 passes through the AND gate 188 and provides KRSCH signal for setting a search command memory 190, whereupon the memory 190 provides a search (SRCH) signal to a terminal 192. The search signal is provided to the terminal 112 (FIG. 4) and conditions the operation of the address memory 34. The search signal is likewise provided to an AND gate 194. To the other input of the AND gate 194 is provided an inverted output from an OR gate 196. Hence, if no RCT signal exists and the auto REW memory 168 provided no output, the SRCH signal is output from the AND gate 194 as an SRH signal which is supplied to the logic gate 170.

When the status where MR equals CT is obtained at position 74 (FIG. 3), an AND gate 198 detects this status and gates the SRH signal from the AND gate 194 to thereby set an auto FWD memory 200. An ATFD signal output from the memory 200 is provided to a pulse generator 202 which produces an EQP pulse signal. The EQP signal passes through an OR circuit 204 and resets the search command memory 190. At the same time, the EQP pulse passes through an OR gate 206 to be provided to the logic gate 170 for energizing an ASTP output line until that pulse terminates. The SRH signal is also provided to a pulse generator 208, which generates a pulse signal (SRHP) for a given period (for example, 0.3 seconds) in response to the SRH signal. The SRHP pulse signal passes through the OR gate 206 to be provided to the logic gate 170. The SRH signal from the AND gate 194 gates the MRH and CTH signals by means of a gate device 210 to energize the AFF output line and AREW output line of the logic gate 170, respectively. The energization of the AFF and AREW output lines by the SRH signal is delayed by the aforesaid (SRHP) signal from the OR gate 206. That is, as long as the SRHP signal is being generated from the pulse generator 208, the logic gate 170 causes the ASTP output line to set the VTR to a stop mode. Thereafter, in response to the input of the SRH signal, the logic gate 170 energizes the AFF output line and the interface device 172 energizes the FF line 60 so as to set the VTR to an FF mode.

The logic gate 170 energizes the ASTP line in response to the signal from the OR gate 206, and it energizes the AFWD line in response to the ATR signal. The MRH signal from the gate device 210 energizes the AFF output line in response to the SRH signal, and the CTH signal energizes the AREW output line in response to the SRH signal. Energization of the output lines ASTP, AFWD, AFF and AREW of the gate 170 causes respective energization of the STP line 56, FWD line 58, FF line 60 and REW line 62 through the interface device 172 and commands that the VTR be driven in the respective operating modes. As long as there is a signal from the OR gate 206, the logic gate 170 energizes the ASTP line and supplied an STP signal to the VTR through the interface device 172 and the STP line 56. The ATFD signal blocks the gate 210. When the EQP signal duration terminates, the ATFD signal output from the auto FWD memory 200 energizes the AFWD line of the logic gate 170, which causes an FWD signal to be supplied to the VTR through the device 172 and the line 58. This causes the VTR to execute the auto play mode 76 that has been explained by reference to FIG. 3.

Depression of the search button 20 at position 78 after a new tape position address has been keyed in causes the aforementioned KSR signal to be generated on the line 152 and also causes the AND gate 188 to generate a KSRCH signal which sets the search command memory 190. The memory 190 then outputs the SRCH signal which is provided to the AND gate 194. The AND gate 194 outputs the SRH signal which triggers the pulse generator 208 to generate the SRHP signal. This SRHP pulse is provided to reset the auto FWD memory 200, and is also provided to the logic gate 170 through the OR gate 206 to energize the ASTP line as long as the duration of the SRHP pulse lasts. On the other hand, the SRH output from the AND gate 194 is directly provided to the logic gate 170. This SRH output also controls the signal to be provided to the logic gate 170 through the gate device 210, to which the MRH output and CTH output of the comparator 40 are provided from the terminals 160 and 162, respectively. The gate device 210 is blocked by an ATFD signal from the auto FWD memory 200. Thus, the MRH and CTH signals are provided to the logic gate 170 when no ATFD signal exists. After the search button 20 is pushed, while the tape is at the position 78 shown in FIG. 3, the CTH signal is provided to the logic gate 170 through the gate 210. The SRH signal causes this CTH signal to energize the AREW line once the duration of the SRHP pulse signal has elapsed. The signal on the AREW line sets the VTR to an auto rewind mode 80 through the interface device 172 and the REW line 62.

When MR becomes equal to CT at position 82, the AND gate 198 is activated and the SRH signal from the AND gate 194 sets the auto FWD memory 200 to generate the aforesaid ATFD signal which blocks the gate 210 as well as triggers the pulse generator 202 to generate, as described before, the EQP signal for bringing the VTR to a temporary stop mode. Thereafter, the ATFD signal sets the VTR to a FWD mode, i.e. play mode. Thus it can be seen that the AND gate 198, the auto FWD memory 200, and logic gate 170 provide automatic start means for setting the video tape recorder to a play drive mode in response to the extinction of both the CTH and the MRH signals.

As described above, the CLCT pulse provided to the terminal 182 for resetting the CTL counter 26 is generated by setting the counter clear memory 180 in response to the presence of the TSENS or ATR signals, and is extinguished by resetting the memory 180 in response to energization of the FWD line 58, FF line 60 and REW line 62. For this purpose, the control apparatus of this invention contains a command signal detector 212 connected to the interface device 172. The detector 212 detects energization of the line 58, 60 or 62 and supplies a reset signal to the counter clear memory 180.

A counter control signal generator 214 constitutes the counter up/down control 64 shown in FIG. 2, and provides the aforesaid CTDWN signal to the CTL counter 26 through a terminal 215.

Depression of the pause key 18 on the keyboard 30 produces KPS signal on the line 151. Said signal is provided to a pulse generator 216 through the AND gate 186 that has been activated in response to the absence of the RCT signal from the OR gate 184. A KPASP pulse signal from the pulse generator 216 sets a pause memory 218 of the set-reset flip-flop type, which provides a signal to an AND gate 222. Therefore, in the presence of an EQP signal, the VTR is set to a pause mode through the line 54 and an output terminal 220. This pause status is set by the EQP signal that is generated when the ATFD signal from the auto FWD memory 200 triggers the pulse generator 202, and is reset by a SRCH signal from the search command memory 190. In other words, if the pause button is pressed during random accessing by the remote control apparatus, the EQP signal generated when MR equals CT sets the VTR to a pause mode, which mode is released by depression of the search button and followed by auto FWD mode. During the pause mode the automatic start means, which normally set the VTR to the play mode once a search has been completed, is inhibited. Thus, during the pause mode, when CT=MR the VTR ceases further tape motion until the search key 20 is depressed.

Depression of the clear key 17 on the keyboard 30 generates a KRST signal on the line 153. The KRST signal provides an MRST signal to the terminal 176 through the OR gate 174 to thereby reset or clear the address memory 34.

The KRST signal resets the search command memory 190 through the OR circuit 204. If the clear button 17 is first depressed when the VTR is in auto FF mode 73 or in auto REW mode 80 as illustrated in FIG. 3, the search command memory 190 is reset by the KRST signal, and the AFF line and AREW line of the gate 170 are deenergized when the SRH signal ceases as a result of the resetting of the search memory 190. However, the VTR continues to perform the FF or REW operation. If the clear button 17 is depressed the second time, the RST signal from an AND circuit 224 becomes effective because the SRH signal is not, at that time, being provided to the pulse generator 208. The effective RST signal then causes the pulse generator 208 to generate an SRHP pulse, which passes through the OR gate 206 and allows the gate 170 to energize the ASTP line temporarily. The VTR is then caused to stop. It should be noted here that the RST signal provided to the pulse generator 208 becomes effective only in the absence of the SRH signal. However, when an MCND signal is being provided from a manual command detector 228 and when the VTR is being controlled by the operation of the auto FWD memory 200, the clear button need be depressed only once for setting the VTR to a stop mode.

If the VTR is set to a specific operation mode and an SRSIG signal is provided to the terminal 154, the OR gate 184 outputs a RCT signal. Generation of the RCT signal disables the AND gates 186 and 188 so that the KPS signal on the line 151 and the KSR signal on the line 152 no longer function. Therefore, if the VTR is in a recording mode, the operation of the pause button 18 and the search button 20 is disabled. The RCT signal is also provided to OR gates 226, 196 and 192. The output of the OR gate 226 resets the auto REW memory 168. The output of OR gate 196 blocks the AND gate 194. The output of the OR gate 192 resets the auto FWD memory 200.

The system control shown in FIG. 5 is so constructed that it gives priority to the operation of the VTR. For this purpose, the control apparatus of this invention contains the manual command detector 228 for detecting energization of the lines 56, 58, 60 and 62 when the VTR is set to a stop mode, play mode, fast-forward mode and rewind mode, respectively. The detector 228 generates the MCND signal, which resets the auto FWD memory 200, the search command memory 190 and the auto REW memory 168 through the OR gates 192, 204 and 226, respectively. Having described a specific embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. In a video tape recording and reproducing apparatus of the type in which video signals are recorded in successive parallel information tracks extending obliquely across a magnetic tape during longitudinal movement of the latter in a recording mode of the apparatus, and the tape further has a control pulse track extending longitudinally along the tape and in which, in said recording mode, servo-system control pulses indistinguishable from each other are recorded in succession in predetermined positions relative to the respective information tracks for use by a servo-system in correctly positioning rotating heads of said recording and reproducing apparatus in respect to said tracks in a reproducing mode of the apparatus, a position control apparatus comprising:
   reading means for serially reading said recorded control pulses and producing a corresponding train of output pulses during longitudinal movement of the tape;
   means for locating said reading means at a reference position along said tape;
   counter means for counting said output pulses produced by said reading means after said reading means has been located at said reference position by said locating means and for providing a count value corresponding to the position of said reading means along said tape measured from said reference position;
   memory means for settably storing a stored value corresponding to a desired position along said tape;
   comparator means for comparing said count value from said counter means and said stored value from said memory means; and
   search means which, upon selective actuation thereof, is operative to cause said longitudinal movement of the tape in the direction for obtaining a predetermined relation between said count and stored values compared by said comparator means.

2. A video tape recording and reproducing apparatus according to claim 1; wherein said search means includes means for causing said longitudinal movement of the tape to occur at a high speed until said predetermined relation is obtained between said count and stored values, and means for automatically causing said longitudinal movement of the tape to continue at a slower speed after said predetermined relationship has been obtained.

3. A video tape recording and reproducing apparatus according to claim 2; wherein said comparator means includes means for generating a first signal that indicates said count value from said counter means is larger than said stored value from said memory means and for generating a second signal that indicates said count value is smaller than said stored value; said search means includes means for setting said video tape recorder to a rewind mode and a fast-forward mode in response to the presence of said first and second signals, respectively; and said means for causing longitudinal movement of said slower speed is responsive to the absence of both said first and second signals.

4. A video tape recording and reproducing apparatus according to claim 3; further comprising means for setting said video tape recorder to a pause mode in which the operation of said means for causing the continued movement of said slower speed is inhibited.

5. In a video tape recording and reproducing apparatus of the type in which a magnetic tape contained in a cassette has video signals recorded thereon in successive parallel information tracks extending obliquely across the tape during longitudinal movement of the latter in a recording mode of the apparatus, and the tape further has a control pulse track extending longitudinally along the tape and in which, in said recording mode, servo-system control pulses indistinguishable from each other are recorded in succession in predetermined positions relative to the respective information tracks for use by a servo-system in correctly positioning rotating heads of said recording and reproducing apparatus in respect to said tracks in a reproducing mode of the apparatus, a position control apparatus comprising:

reading means for serially reading said recorded control pulses and producing a corresponding train of output pulses during longitudinal movement of the tape;

means for locating said reading means at a reference position along a tape, including auto-rewinding means operative, in response to the installation of the respective video cassette in the video tape recording and reproducing apparatus to bring said tape in the video cassette to a tape start position;

counter means for counting said output pulses produced by said reading means after said reading means has been located at said reference position by said locating means and for providing a count value corresponding to the position of said reading means along said tape measured from said reference position, said counter means including means to reset said counter means to zero in response to the operation of said auto-rewinding means;

memory means for settably storing a stored value corresponding to a desired position along said tape;

comparator means for comparing said count value from said counter means and said stored value from said memory means; and search means which, upon selective actuation thereof, is operative to cause said longitudinal movement of the tape in the direction for obtaining a predetermined relation between said count and stored values compared by said comparator means.

* * * * *